United States Patent Office 3,585,690
Patented June 22, 1971

3,585,690
APPARATUS FOR INJECTION MOLDING AND EJECTION OF PLASTIC ARTICLES
Alvin S. Tucker, Dexter, Mich., assignor to Phillips Petroleum Company
Filed July 1, 1969, Ser. No. 838,268
Int. Cl. B29f 1/00
U.S. Cl. 18—30                                              8 Claims

ABSTRACT OF THE DISCLOSURE

A method and apparatus for injection molding and ejecting plastic articles from the mold whereby the article is separated from the mold elements in stages and the forces of ejection are reduced and distributed over several portions of the molded article.

---

Figure 1:
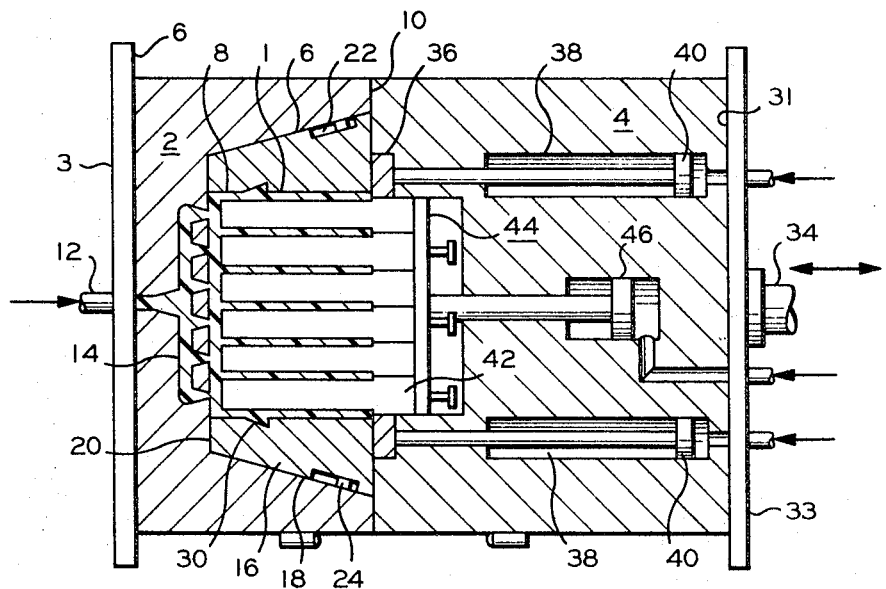

This invention relates to apparatus and method for molding and ejecting plastic articles. In another aspect, this invention relates to molding and ejecting complex plastic articles having open or hollow interior portions.

In the past, molding of plastic articles have been faced with the problem of ejecting the molded article from its mold without damaging said article. This problem becomes increasingly complex as the molded article is constructed with open or hollow interior portions. Molding plastic articles with hollow interior portions requires a mold having core elements which must thereafter be separated from the molded article. These core elements provide an increased surface in contact with the molded article which significantly increases the forces required to separate the mold portions. In addition, a greater surface of the molded article is exposed with a correspondingly greater likelihood of damaging or destroying the article during mold separation. Owing to the greater surface in contact with the mold, larger power sources must be utilized to separate molds having core elements. Other factors which cause the need for greater mold separation forces and increase the probability of article damage with heretofore used molds are articles of long length and core sections and articles with small draft.

It is therefore an object of this invention to provide an apparatus and method for forming and ejecting plastic articles. Another object of the invention of the above described type is to provide a separable mold for molding complex plastic articles. Yet another object of this invention is to provide a mold from which the molded article can be ejected by taking advantage of the forces acting upon the articles while in said mold thereby reducing the forces normally required for ejection of the article. Other aspects, objects, and advantages of the present invention will become apparent from a study of the disclosure, the appended claims, and the drawing.

The drawings which comprise six figures are schematic diagrams in partial cross-section showing the mold and associated elements of this invention at various operating positions during the opening of the mold for ejection of the molded article.

Referring to FIG. 1, a separable injection mold having a mold cavity section 2 and a mold core section 4 are shown in the first or closed position for molding article 1. The mold cavity section 2 has a mounting surface 6 fixed to a stationary mounting platen 3 to maintain said mold section 2 in a fixed position relative to the mold core section 4. The mold cavity section 2 has a cavity 8 formed therethrough opening on the parting surface 10. A sprue 12 extends through the first end portion 6 of the mold cavity section 2, is connected on one end to a plastic material injection machine (not shown) and on the other end to a plurality of runners 14 opening into the cavity of the mold cavity 8 for injecting plastic molding material.

Tulips 16, forming a portion of cavity 8, are sealably and slidably positioned within an opening of the mold cavity section 2 for movement from an article-holding position (shown) wherein the outer surface 18 and the first end 20 of the tulips 16 are in sealable contact with portions of the mold cavity section 2 to an article-releasing position (better seen in FIG. 4) wherein the first end 20 of the tulips 16 is moved outwardly from the first position in the mold cavity section 2. Tulips 16 are wedge-shape fittings within the opening of mold cavity section 2 having their smaller end mounted toward the mounting surface 6 and their larger ends terminating along parting surface 10. Means for restricting movement of the tulips 16, for example a slot 22 formed on the tulips 16 and a stop-bar 24 on the mold cavity section 2 within the slot 22, or the like, are provided to terminate movement of the tulips 16 with the molded article 1 at the article-releasing position and maintain a portion of the tulips 16 within the cavity 8. A tulip cavity surface 28 (better seen in FIG. 5) having any desired configuration is provided to form the outer surface 27 of the molded article 1. The tulips 16 must however be sufficiently movable relative to the mold cavity 8, so that at the article-release position of said tulips the molded article 1 can be extracted from said tulips 16. The tulip cavity surface 28 of this invention must also have a holding means 30 (to be more fully described), for example a groove, to prevent removal of the article 1 during certain operations of the ejection of the molded article 1.

Mold core section 4 has a mounting surface 31 fixed to a reciprocably movable mounting platen 33. In the first position, a parting surface 32 of the mold core section 4 (better seen in FIG. 2) is sealably abutting the parting surface 10 of the mold cavity section 2. A shaft 34, or other power transmission means, is attached to the platen 33 for movement of said mold core section 4 from the first or mold-closed position (shown) to a second or mold-open position spaced from the mold cavity section 2, to be later more fully described. A stripping ring 36 is movably mounted on the mold core section 4 in contact with the molded article 1, core elements 42, and the tulips 16 at the first position and movable toward the tulips 16 during movement of the mold core section 4 away from the tulips 16 as said mold element 4 moves toward the second position. At least one power system, preferably more than one power system, is connected to the stripping element 36 for movement of said stripping element 36 relative to the mold core section 4. It is desired that a plurality of power systems be connected with the stripping element 36 to exert a more equal pressure on the stripping element and maintain linear movement of the stripping element 36. It is also preferred that the power systems associated with the stripping element 36 be conventional hydraulic systems having cylinders 38 associated with the mold core section 4 and pistons 40 positioned within the cylinders 38. Hydraulic systems are preferred to provide a power system that is compact and easily adjustable to maintain the relative travel rates of the elements of this invention. Individual core elements 42 are attached to a core element rack 44. One portion of the core elements 42 is rigidly attached to the rack 44 and other portions are movably attached to said rack 44. By this construction, movement of the rack 44 in a direction moving from the molded article 1 initially moves one portion of the core elements 42 relative to the molded article 1 and thereafter moves another portion of said core elements 42 relative to said molded article 1. By constructing the core elements 42 so that all core elements are not simultaneously moved relative to the molded article 1, the power requirements for separating the core elements from the molded article 1 and the dangers of causing damage to the molded article 1 during said separation are reduced. Where the molded article 1 comprises a multitude of hollow portions defining divider member 41 within article 1, thus requiring a multitude of core elements 42, it is preferred that the movable core elements be arranged relative to those core elements that are rigidly attached to the core element rack 44 in such a manner that the forces exerted on the rack 44 by the separation of the core elements 42 from the molded article 1 are generally balanced. This general balancing of the core elements 42 will prevent misalignment of the core rack 44 with corresponding damage to the molded article 1 during ejection operations. An element means 46, preferably a hydraulic system as previously described, is associated with the mold core section 4 and attached to the core element rack 44 for initial movement of the mold core elements 42 from the first toward the second position while maintaining all core elements 42 and the core rack 44 at the first position.

FIGS. 2–6 show the apparatus of this invention as described with reference to FIG. 1, at various operational positions during continuous travel of the mold core section toward the second position.

In the operation of this invention, referring to FIG. 1, a power means (not shown) is applying force through shaft 34 to hold the mold core section 4, the stripping element 36, and the core elements 42 in sealable contact with the mold cavity section 2 and associated tulips 16. Plastic molding material is passed through the sprue 12, the runners 14, and into the cavity 8 between tulips 16 and core elements 42, thereby forming the molded article 1. The apparatus of this invention is thereafter maintained in this first position, as shown in FIG. 1, until the plastic material has sufficiently set and the mold can be opened without damage to the article 1. This time period is dependent upon various factors such as the type of plastic material used, the temperature, the pressure, etc. Thereafter the power source connected to the shaft 34 and the power source connected to the stripping element 36 are energized.

Figure 2:
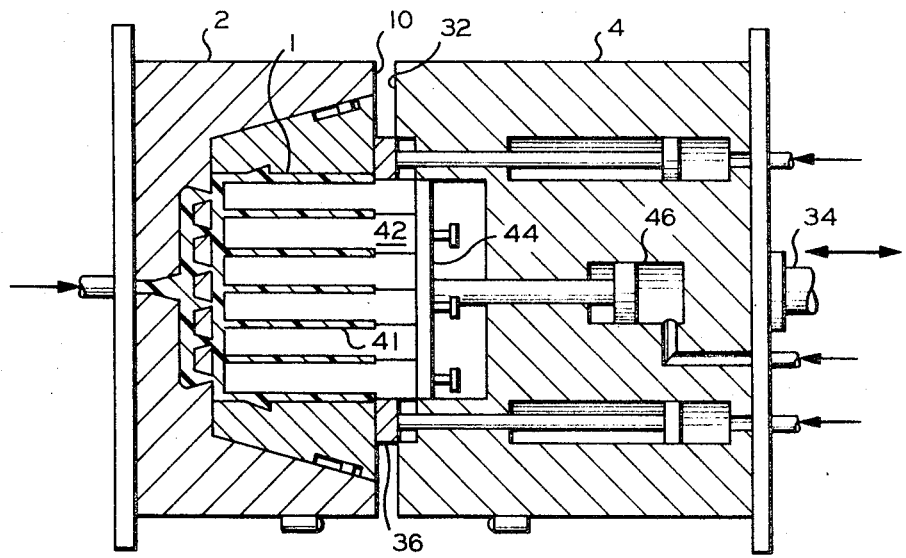

Referring to FIG. 2, the mold core section 4 has been moved by the shaft 34 over a first distance from the first position toward the second position. The stripping element 36 has been driven by its associated power source in an opposite direction relative to the movement of the mold core section 4 at a substantially constant rate of speed. The movement of the mold core section 4 over the first distance is at a rate of speed equal to the rate the stripping element 36 is driven. During movement of the mold core section 4 over the first distance, the tulips 16 and molded article 1 are thereby maintained in their first position by the stripping element 36 and the element means 46 and its associated core element rack 44 moves from its first position toward the first end 32 of mold core element 4. Travel of the element means 46 and the associated core element rack 44 is terminated as the mold core element 4 reaches the end of the first distance of travel. By constructing the apparatus of this invention to separate by initially moving the mold core section 4 through a first distance while maintaining the associated elements at their first position, the power requirements for separation are reduced by avoiding simultaneously separating the molded article 1 and moving the relatively heavy mold core section 4 from an at-rest position. It is preferred that the length of the first distance moved by the mold core section 4 be in the range of 1% to 6% of the distance from the first to second position. By so limiting the length of the first distance, the apparatus of this invention can be constructed in a compact form while reducing the power requirements for mold separation and article ejection.

Figure 3:
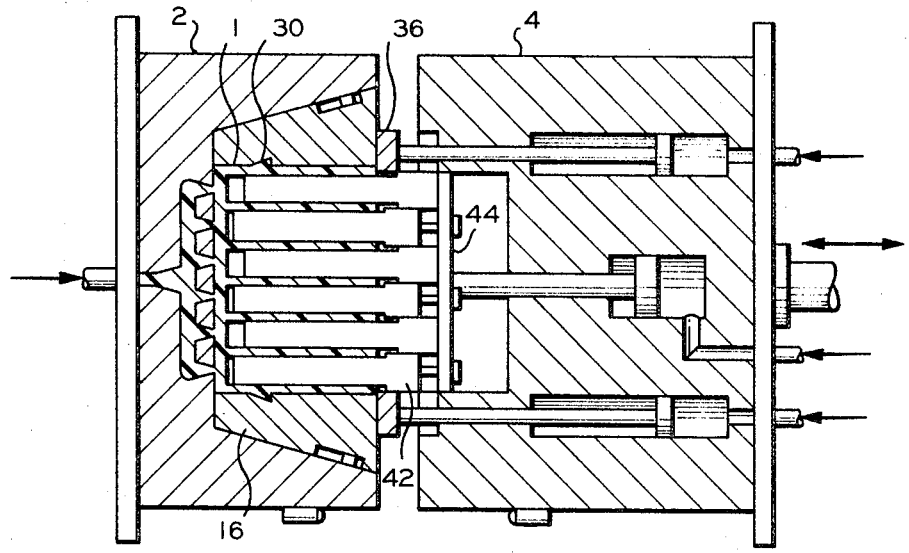

FIG. 3 shows the apparatus of this invention after movement of the mold core section 4 over the second distance. During movement of the mold core section 4 from the end of the first distance to the end of the second distance, the stripping element 36 and said mold core section 4 are moving in opposite directions at an equal rate of travel. Correlation of the stripping element 36 and the mold core section 4 for equal and opposite relative movement maintains the molded article 1 and the tulips 16 in the first position during movement of the mold core section 4 over the second distance.

Ejection of the molded article 1 from core elements 42 is initiated during movement of the mold core element 4 over the second distance. As previously described, movement of the element means 46 relative to the mold core section 4 is terminated when said mold core section 4 has traveled over the first distance. Further travel by the mold core section 4 over the second distance causes the core element rack 44 and the portion of the core elements 42 rigidly attached to said rack 44 to move in conjunction with the mold core section 4 over the second distance. During movement of the mold core section 4 over the second distance, the remaining portions of the core elements 42 are also moved by the rack 44. In other words, during movement of the mold core section 4 over the second distance, one portion of the core elements 42 are moved relative to the molded article and thereafter the remaining core elements 42 are moved relative to the molded article 1 while the molded article 1 and the tulips 16 are maintained in the first position by the stripping element 36.

It is preferred that the second distance be in a range of 4% to 8% of the distance from the first to second position so that the core elements 42 can be separated from the molded article 1 with reduced power requirements, yet the apparatus can be compactly constructed. By avoiding simultaneously stripping of all core elements 42 from the molded article, the power requirements and dangers of damage to the molded article 1 are reduced. It should also be pointed out that, during initial stripping of the core elements 42 from the molded article 1, the force required to maintain the molded article 1 stationary relative to the moving core elements 42 is distributed over several portions of the molded article and are not concentrated at highly localized positions as with heretofore molding apparatus. In the apparatus and methods of this invention, forces maintaining the molded article 1 during initial movement of the core elements 42 relative to said molded article 1 are exerted on the outer surfaces 27 of the molded article 1 in contact with the stripping element 36, the entire surfaces of the tulips 16 that are in contact with the molded article 1, the tulip-holding means 30, the sprues associated with each runner 14 and the portion of the bottom surface of the cavity of the mold cavity section 2 in contact with the molded article 1.

The apparatus of this invention can also be constructed so that the core elements 42 are initially separated in more than two stages from the molded article 1 during movement of the mold core section 4 over the second distance. Core element separation in several stages can be accomplished by varying to a multitude of distances the length of travel of individual core elements 42 relative to the core element rack 44. Constructing the core elements in this manner further reduces the power requirements needed to loosen the core elements 42 from the molded article 1.

Figure 4:
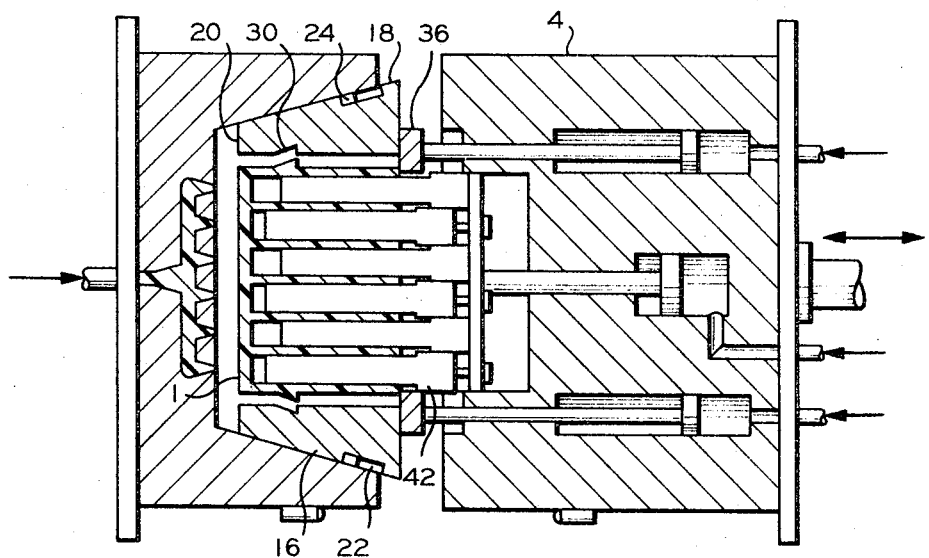

FIG. 4 shows the apparatus after movement of the mold core section 4 over the third distance. During movement of the mold core section 4 from the end of the second distance to the end of the third distance, the mold core section 4 is moving in an opposite direction relative to the stripping element 36 and at a greater rate of travel than said stripping element. The difference in the relative, oppositely directed rate of travel is a rate such that the tulips 16 and the molded article 1 are moved with the mold core section 4 and the tulips are moved to the article-releasing position as the mold core section 4 reaches the end of the third distance. Therefore, as the mold core section 4 moves over the third distance, the core elements 42, the stripping element 36, article 1, and the tulips 16 are moved toward the second position with the mold core section the article 1 is separated from contact with the mold cavity section 2 and the tulips 16 and the associated tulip-holding means 30 are disengaged from the molded article 1. This initial separation of the article 1 from the mold cavity section 2 and the tulips 16 is in steps with the article 1 first separating from the mold cavity section 2 and further movement thereafter separating said molded article 1 from the tulips 16. By avoiding simultaneous separation of the molded article 1 from the mold cavity section 2 and the tulips 16, the power requirements and dangers of damage to the molded article 1 are reduced.

At the article-releasing position of the tulips 16, at which the tulips separate from the molded article 1, the tulips 16 are maintained with the mold cavity section 2 by, for example, the slot 22 and the stop-bar 24, during movement of the mold core section 4 and the associated elements toward the second position. It is preferred that the third distance be in a range of 6% to 15% of the distance from first to the second position so that the tulips can be moved to their article-releasing position and the molded article 1 separated from the tulips 16 and the mold cavity section 4 with reduced power requirements, yet the apparatus can be compactly constructed.

Figure 5:
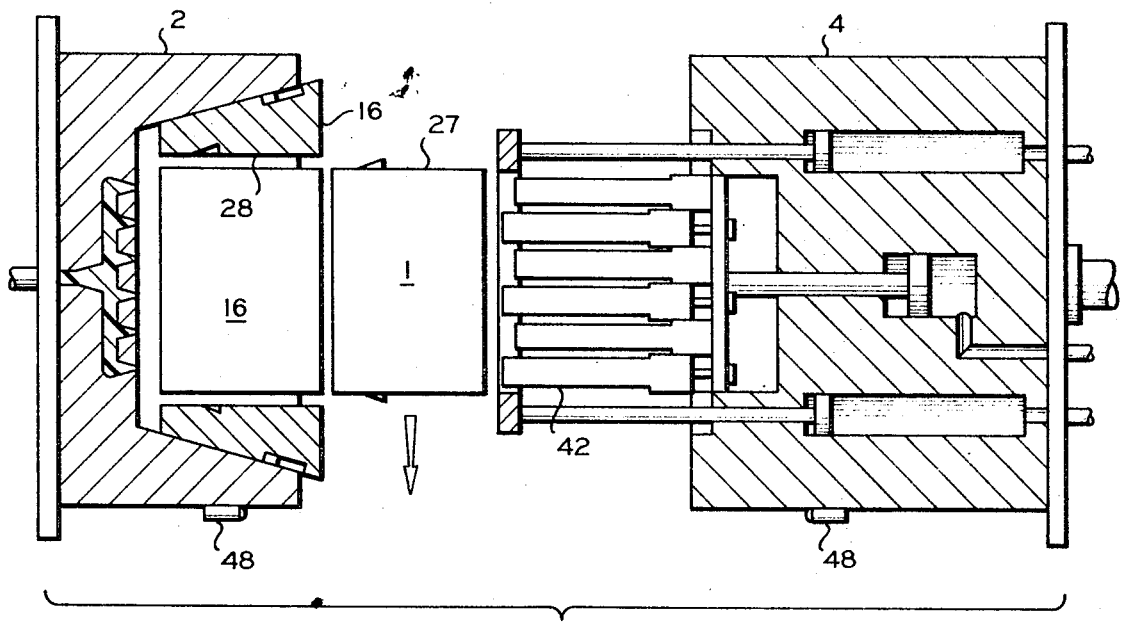

FIG. 5 shows the apparatus at the second position after movement of the mold core element over the fourth distance. It is preferred that the fourth distance to be approximately 80% of the distance from first to second position. During the movement of the mold core section 4 from the end of the third distance and over the fourth distance to the second position, the mold core section 4 is moving in an opposite direction relative to the stripping element 36 and the molded article 1 at a greater rate of travel than said stripping element 36 and molded article 1. The difference in the relative, oppositely directed rates of travel and the length of the fourth distance are such that the stripping elements 36 is at the end of the core elements 42 and the molded article 1 is spaced from the stripping element 36, core elements 42, tulips 16, and mold cavity section 2 at the second position of the mold core element 4. The fourth distance is a length such that the separated molded article 1 can be removed from the system when the mold core section 4 is at the second position. It is preferred that the separated molded article 1 move by gravity from the system and break a light beam, for example, on its downward path from the system. The light beam, for example, here shown between the mold cavity section 2 and the mold core section 4, is created by light source-sensors 48 which are connected to the power sources which drive the cylinders 40 of the mold core section 4 and the shaft 34. The light source-sensors 48 may be positioned at other locations so long as the molded article 1 moving from the system breaks the light beam after said article is spaced from said system. Other activating means other than a light beam can be used, such as a trip-wire or a balance arm.

Figure 6:
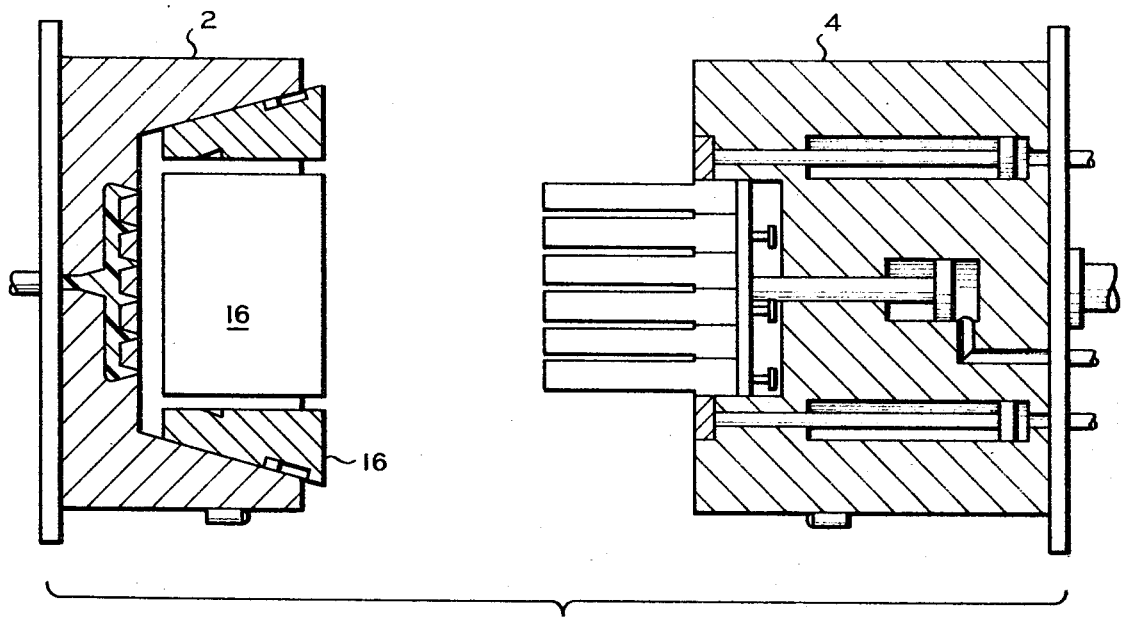

FIG. 6 shows the apparatus after the article has fallen away from the system and the light beam, for example, has been broken. Breaking of the light beam activates the drive cylinders of the mold core section 4 and the shaft 34 and cause the associated elements to return from the second, or mold-open, position to the first, or mold-closed, position shown in FIG. 1, at which first position a new cycle is initiated.

Although the invention has been fully described with reference to core elements, the separation of a molded article in steps from the mold cavity section and tulips can utilize this invention although said molded article does not possess a configuration requiring core elements for the molding thereof. Ejection by the use of this invention of the above described mold having no core portions would also require reduced power requirements. Further modifications and alterations of this invention will become apparent to those skilled in the art from the foregoing discussion and accompanying drawings, and should be understood that this invention is not to be duly limited thereto.

That which is claimed:

1. In an injection mold for forming and ejecting a molded plastic article comprising a mold cavity section, tulips slidably mounted within the mold cavity section for movement from an article-holding position to an article-releasing position, and a mold core section having associated core elements, a stripping element, said mold section and associated core elements and stripping elements being movable between a first position at which the core elements are positioned within the tulip and the article is formed and a second position wherein the molded, mold core section, core elements, and stripping elements are spaced a distance from said mold cavity section and associated tulips, the improvement comprising:
   a plurality of individual core elements in contact with the molded article;
   a core element rack slidably mounted on the mold core section, rigidly attached to one portion of the individual core elements, and slidably attached to another portion of the individual core elements for movement at spaced intervals relative to the molded article, portions of said core elements;
   a stripping ring in contact with the molded article and the core elements and associated with and movable relative to the mold core section for maintaining the tulips in the article-holding position during a portion of the operating cycle;
   at least one power source connected to the stripping element for moving said stripping ring along the core elements at a substantially constant rate of speed; and
   means for moving the mold core section over a first distance from the first position toward the second position at a rate equal to the rate of travel of the oppositely moving stripping element, moving the mold core section and the core elements during movement of the mold core section over a second distance at a rate greater than the rate of travel of the oppositely moving stripping ring, moving the mold core section, the core element, the stripping ring, the tulips from the article-hold position to the article-release position and the molded article, during movement of the mold core element over a third distance at a rate greater than the rate of travel of the oppositely moving stripping ring, moving the mold core section, the core elements, and the molded article during movement of the mold core section and the oppositely directed movement of the stripping ring relative to the mold core section over a fourth distance terminating at the second position, at which section position the molded article is ejected from the core elements, and moving the mold core section, the core elements, and the stripping ring from the second position the molded article is ejected from article-releasing to the article-holding position.

2. An apparatus, as set forth in claim 1, wherein a power system is connected to the core element rack that is connected to the core elements for oppositely moving the rack from a first to a second position relative to the mold core section at a rate equal to the rate of travel and during the movement of the mold core section over the first distance, maintaining the core element rack at the second position during movement of the mold core section over the second, third, and fourth distances to the second position of the mold core section and moving the rack from its second to its first position.

3. An apparatus as set forth in claim 2, wherein the core element rack is rigidly attached to one portion of the core elements and movably attached to another portion of the core elements for moving one portion of the core elements relative to the molded article and thereafter moving the other portion of the core elements relative to the molded article.

4. An apparatus, as set forth in claim 2, wherein the power system connected to the core element rack comprises a hydraulic cylinder and piston having a stroke length equal to the first distance traveled by the mold core section.

5. An apparatus, as set forth in claim 1, wherein the power system connected to the stripping element comprises a hydraulic cylinder and piston.

6. An apparatus, as set forth in claim 1, wherein the means for moving the mold core section comprises a hydraulic cylinder and piston.

7. An apparatus, as set forth in claim 1, wherein the first distance moved by the mold core element from the first position toward the second position is in the range of 1% to 6% of the distance from the first to the second position, the second distance is in the range of 4% to 8% of the distance from the first to the second position, the third distance is in the range of 6% to 15% of the distance from the first to the second position, and the fourth distance is the remainder of the distance from the first to the second position.

8. An apparatus, as set forth in claim 1, wherein an actuating means is positioned adjacent the injection mold within the pathway of the molded article moving from the stripping ring away from injection mold, is triggered by said molded article, and is constructed to cause the mold core element and associated elements to move from the second position toward the first, said actuating means is triggered by said article.

References Cited

UNITED STATES PATENTS

| 2,542,263 | 2/1951 | Schultz | 18—30WMX |
| 2,607,080 | 8/1952 | Stewart | 18—42R |
| 2,829,400 | 4/1958 | Morin | 18—48RX |

H. A. KILBY, JR., Primary Examiner

U.S. Cl. X.R.

18—42

UNITED STATES PATENT OFFICE

CERTIFICATE OF CORRECTION

Patent No. 3,585,690  
Dated: June 22, 1971

Alvin S. Tucker

It is certified that error appears in the above-identified patent and that said Letters Patent are hereby corrected as shown below:

Column 6, line 57, after the word "position", delete remainder of line, and insert — to the first position and the tulips from the —.

Signed and sealed this 7th day of December 1971.

(SEAL)  
Attest:

EDWARD M. FLETCHER, JR.  
Attesting Officer

ROBERT GOTTSCHALK  
Acting Commissioner of Patents

UNITED STATES PATENT OFFICE

CERTIFICATE OF CORRECTION

Patent No. 3,585,690                      Dated: June 22, 1971

Alvin S. Tucker

It is certified that error appears in the above-identified patent and that said Letters Patent are hereby corrected as shown below:

Column 6, line 10, after the word "mold" and before "section" insert — core —;
Column 6, line 14, after "molded" and before the "comma", insert — article —.

Signed and sealed this 22nd day of February 1972.

(SEAL)
Attest:

EDWARD M. FLETCHER, JR.          ROBERT GOTTSCHALK
Attesting Officer                 Commissioner of Patents